Oct. 19, 1948.　　　A. B. CLARK ET AL　　　2,451,660
VEHICLE COUPLER
Filed Aug. 6, 1946　　　2 Sheets-Sheet 1
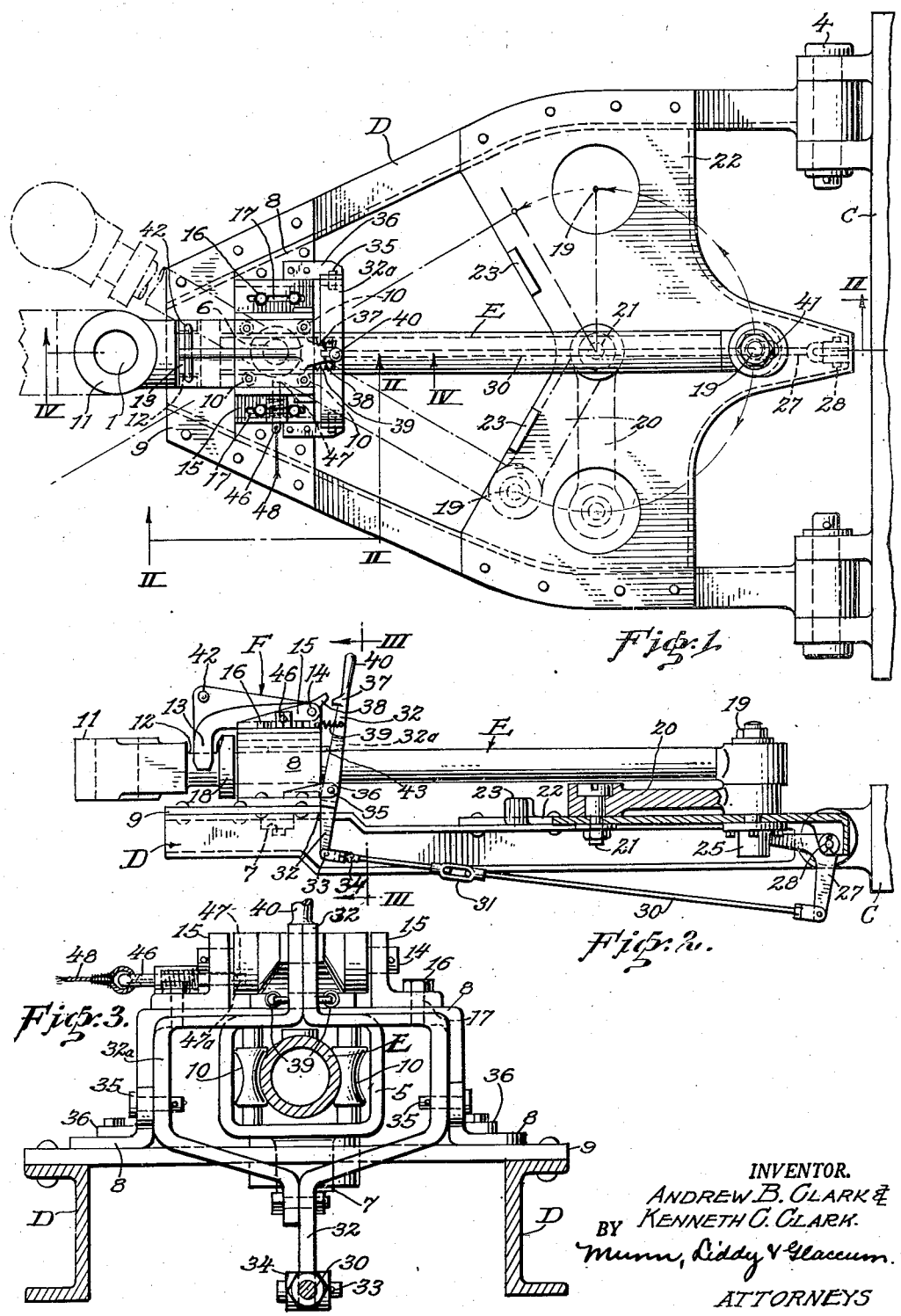
INVENTOR.
ANDREW B. CLARK &
BY KENNETH C. CLARK.
Munn, Liddy & Glaccum.
ATTORNEYS Oct. 19, 1948.                A. B. CLARK ET AL                2,451,660
                                VEHICLE COUPLER
Filed Aug. 6, 1946                                          2 Sheets-Sheet 2
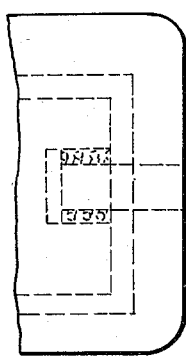
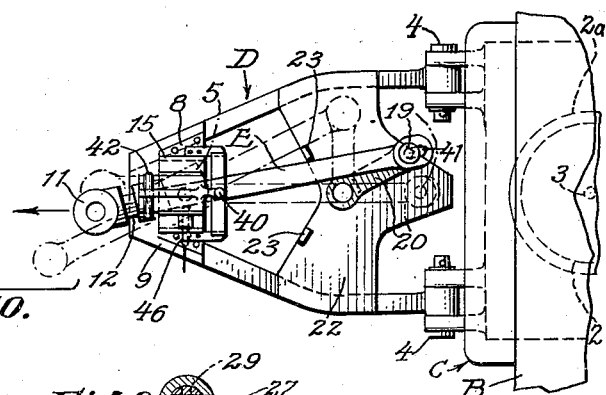
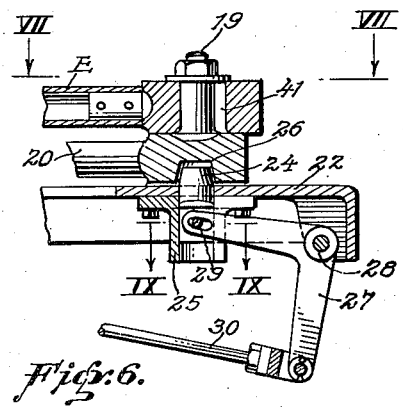
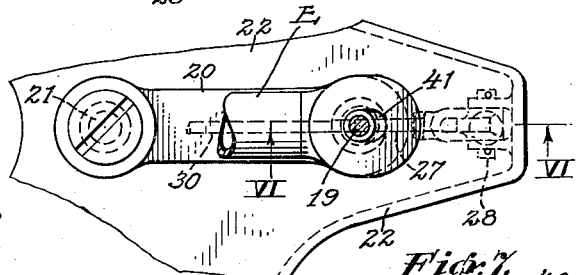
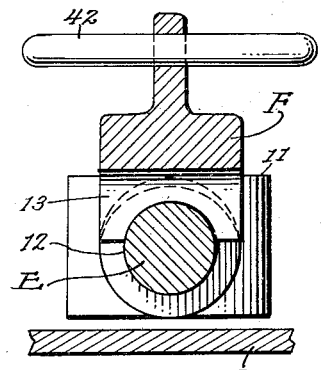
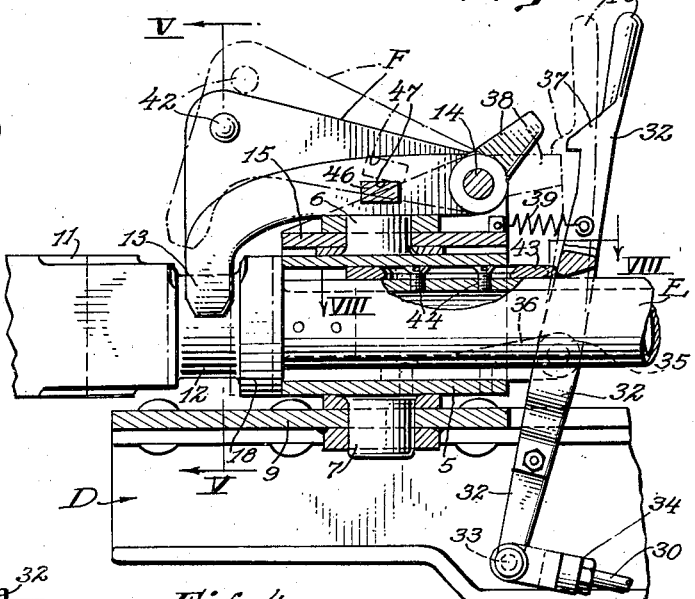
INVENTOR.
ANDREW B. CLARK &
KENNETH C. CLARK.
BY Munn, Liddy & Glaccum
ATTORNEYS Patented Oct. 19, 1948

2,451,660

UNITED STATES PATENT OFFICE 2,451,660

VEHICLE COUPLER

Andrew B. Clark and Kenneth C. Clark,
Watsonville, Calif.

Application August 6, 1946, Serial No. 688,664

7 Claims. (Cl. 280—33.15)

An object of our invention is to provide a vehicle coupler in which the tongue of the towed vehicle is provided with an extensible draw-bar having an eye adapted to be placed over the pintle of a truck, the bar being similar to the one shown in our copending application, Serial No. 716,376 filed December 14, 1946; but in which different means is provided for guiding the rear end of the draw-bar into a proper position with respect to the tongue when the bar is fully retracted.

A further object of our invention is to provide a device of the type described, which has automatic means for securing the draw-bar against movement with respect to the tongue when the bar is fully retracted, this means engaging with the front of the bar to prevent longitudinal movement and engaging with the rear of the bar to prevent lateral movement.

A still further object of our invention is to provide a manual release for the automatic securing means which will simultaneously free the securing means from the front and rear ends of the bar.

Other objects and advantages will appear in the following specification, and the novel features of the device will be particularly pointed out in the appended claims.

Our invention is illustrated in the accompanying drawings forming a part of this application, in which:

Figure 1 is a top plan view of the vehicle coupler as shown operatively applied to a tongue of a trailer;

Figure 2 is a longitudinal section taken substantially along the line II—II of Figure 1, portions being shown in elevation;

Figure 3 is a transverse section taken along the line III—III of Figure 2;

Figure 4 is an enlarged longitudinal section taken along the line IV—IV of Figure 1;

Figure 5 is a transverse section taken along the line V—V of Figure 4;

Figure 6 is a longitudinal section taken along the line VI—VI of Figure 7;

Figure 7 is a horizontal section, taken along the line VII—VII of Figure 6;

Figure 8 is a horizontal section taken along the line VIII—VIII of Figure 4;

Figure 9 is a horizontal section taken along the line IX—IX of Figure 6; and

Figure 10 is a schematic view showing the use of our device in connecting a truck and trailer together.

While we have shown only the preferred form of our invention, it should be understood that various changes or modifications may be made within the scope of the appended claims without departing from the spirit and scope of the invention.

In carrying out our invention, we make use of a truck indicated generaly at A (see Figure 10). The truck is provided with a pintle 1. We also make use of a trailer indicated at B and this trailer has the usual upper fifth wheel indicated at 2. In Figure 10, we disclose wheeled chassis C having a lower fifth wheel 2a that is designed to be connected to the upper fifth wheel 2 by means of a king-pin 3. A tongue D is pivotally secured to the wheeled chassis at 4. The parts thus far described are standard and form no part of our invention, except insofar as they cooperate with the parts now to be described.

In Figure 4, we show a draw-bar E slidably received in a sleeve 5 and the sleeve has upper and lower trunnions 6 and 7, respectively, that are rotatably received in a top U-shaped plate 8 and a lower plate 9, see Figure 3. This part of the device is substantially the same as that disclosed in our pending application above referred to.

The sleeve 5 is rectangular in cross section and carries concave rollers 10 that bear against opposite sides of the draw-bar for guiding the latter as it is moved longitudinally through the sleeve. Figure 1 illustrates a pair of rollers disposed on each side of the draw-bar, although we do not wish to be confined to any exact number. The sleeve may be non-circular in cross section, if desired, so as to prevent the draw-bar from rotating relative to the sleeve.

At the forward end of the sleeve we provide a pintle-receiving eye 11 and immediately in back of the eye the draw-bar is provided with an annular groove 12 for receiving the yoke-shaped end 13, see Figure 5, of a latching member indicated generally at F. In Figures 2 and 4, we illustrate the latch F as being pivoted at 14 between two brackets 15 that are adjustably secured to the top plate 8 by means of cap screws 16 that are received in slots 17 provided in the brackets. In this way the latch F can be adjusted so that its yoke end 13 will be positioned above the annular groove 12. The draw-bar E carries a collar 18 that forms one wall of the groove 12 and bears against the yoke 13 when the latter is in closed position.

The rear end of the draw-bar is pivotally connected at 19, see Figure 6, to an arm 20. The other end of the arm 20 is pivoted at 21 to a rear cross plate 22 that in turn is carried by the tongue D. The arm is free to swing through an arc somewhat greater than 180° and this will permit the draw-bar E to be swung into angular positions as shown by the dot and dash lines in Figure 1 and also to be extended beyond the tongue as illustrated in Figure 10. If desired, the plate 22 may carry stops 23 for limiting the swing of the arm 20. The stops need not be used and the arm then will be swingable through a complete circle.

We provide novel means for holding the arm against swinging movement when the draw-bar E has been retracted to its rearmost position. Referring to Figure 6, it will be noted that we show a trigger pin 24 that is slidable in a cylinder 25 and the trigger pin is adapted to enter a recess 26 formed in the bottom of the arm 20 when the axis of the recess coincides with the axis of the pivot stud 19. A bell-crank lever 27 is pivoted at 28 to the cross plate 22 and one end of the bell-crank is pivotally connected to the trigger pin at 29, while the other end is connected to an actuating rod 30. Figure 2 shows the rod 30 as being provided with a turnbuckle 31 for adjusting the length of the rod and the forward end of the rod is connected to a lever 32 by a pivot pin 33 and a swivel 34. The lever 32 has a rectangularly shaped mid-portion 32a, see Figure 3, for permitting the draw-bar to swing therein and the sides of the mid-portion are pivoted at 35 to brackets 36 that in turn are supported by the ends of the upper plate 8.

The lever has a hook 37 that is adapted to engage a detent 38 carried by the rear end of the latch F. Coil springs 39 urge the lever 32 toward the latch so as to hold the latch in raised position as indicated by the dash lines in Figure 4. When the lever 32 is moved rearwardly by means of the handle 40, the latch F will be released and at the same time the rod 30 will swing the bell-crank lever 27 for moving the trigger pin 24 into the recess 26 for holding the draw-bar E in retracted position.

In Figures 6 and 7, we show the pivot stud 19 received in an elongated slot 41 in the draw-bar E and the purpose of this is to permit the draw-bar to be moved a slight distance in a forward direction as soon as the latch F is manually raised by means of handles 42. This slight forward movement of the draw-bar with respect to the arm 20 causes the draw-bar to move an automatic release finger 43 (see Figures 4 and 8) out of contact with the lever 32 and therefore the springs 39 can move the hook 37 over the detent 38 for holding the latch in raised position. At the same time the trigger pin 24 is removed from the recess 26 and will permit the draw-bar E to be manually swung laterally and the arm 20 to swing about its pivot 21. The initial lateral swinging of the arm is necessary to move it past dead center position with respect to the draw-bar.

The automatic release finger 43 shown in Figure 8 is of the same construction as that shown in our copending case above referred to. The finger is adjustably secured to the draw-bar E by screws 44 that are received in a slot 45 formed in the finger. Figure 4 shows how the rear end of the finger will contact the lever 32 to swing it into the full line position for releasing the latch F when the draw-bar is in retracted position and the annular groove 12 is ready to receive the yoke 13 of the latch F. A spring, not shown, may be used for swinging the latch into closed position, if desired.

In order to retain the latch F against accidental removal, we provide a positive lock, such as a spring-pressed bolt 46, see Figures 1 and 3, that is designed to enter a recess 47 formed in the side of the latch F. The bolt has a bevelled end 47a (see Figure 3) that will cause it to retract as the latch swings downwardly in the same manner as a bevelled bolt for a door. A cable 48, or other suitable means may be used for freeing the bolt from the latch when it is desired to lift the latch from the draw-bar.

From the foregoing description of the various parts of the device, the operation thereof may be readily understood.

In Figure 10, we show the truck backed up to a point near the trailer. The trailer tongue is shown slightly out of alignment with the truck pintle. The draw-bar E may be freed by raising the latch F. The draw-bar is now moved forwardly the length of the slot 41 which will move the release finger 43 away from the lever and permit the hook 37 to engage the detent 38 to hold the latch raised. The swinging of the lever 32 counter-clockwise in Figure 2 will free the trigger pin 24 from the recess 26. The draw-bar may now be moved forwardly to bring the eye 11 into a position to receive the pintle 1. The pintle is inserted through the eye and the truck is backed toward the trailer. This will cause the draw-bar to be retracted with respect to the tongue. The arm 20 will swing the draw-bar into parallel position with the longitudinal axis of the tongue. As soon as the draw-bar reaches its rearmost position, the finger 43 will strike the lever 32 to free the latch F and at the same time the rod 30 will move the trigger pin 24 into the recess 26 which is now aligned with the pin. The freeing of the hook 37 from the latch F will permit the latter to fall into the groove 12 and the bolt 46 will hold the member F in closed position. In this way, the truck is automatically coupled to the trailer and the driver need not get out of his cab to effect the connection after the eye 11 has once been connected to the pintle 1.

We claim:

1. The combination with a vehicle tongue, of a sleeve pivotally secured thereto, a draw-bar slidably carried by the sleeve, the front end of the bar having a pintle-receiving eye, an arm having one end pivotally secured to the tongue and its other end pivotally secured to the rear end of the draw-bar, the arm permitting the bar to assume various angular positions when the bar is extended to connect the eye to a truck pintle, the arm paralleling the bar when the latter is fully retracted, and automatic means engaging with the bar when the bar is retracted for holding the bar from longitudinal movement and lateral swinging movement with respect to the tongue.

2. The combination with a vehicle tongue, of a sleeve pivotally secured to the tongue and being swingable about an axis that extends at right angles to the plane of the tongue, a draw bar slidably carried by the sleeve and having a pintle-receiving eye at its front end, a collar placed on the bar near the eye, said bar having a longitudinally extending slot at the rear end, an arm pivoted to the tongue, a trunnion carried by the free end of the arm and being slidably received in the slot, a latch pivotally connected to the tongue and engaging with the collar when the bar is fully retracted, a hook for holding the latch in released position, said arm paralleling the bar when the latter is fully retracted, a trigger engageable with the arm for holding it from swinging when the bar is retracted, and connections between the hook and trigger for releasing the trigger from the arm when the hook engages with the latch for holding it in released position.

3. The combination with a vehicle tongue, of a sleeve pivotally secured to the tongue and being swingable about an axis that extends at right angles to the plane of the tongue, a draw bar slidably carried by the sleeve and having a pintle-receiving eye at its front end, a collar placed on the bar near the eye, said bar having a longitudinally extending slot at the rear end, an arm pivoted to the tongue, a trunnion carried by the free end of the arm and being slidably received in the slot, a latch pivotally connected to the tongue and engaging with the collar when the bar is fully retracted, a hook for holding the latch in released position, said arm paralleling the bar when the latter is fully retracted, a trigger engageable with the arm for holding it from swinging when the bar is retracted, and connections between the hook and trigger for releasing the trigger from the arm when the hook engages with the latch for holding it in released position, and means carried by the bar for automatically releasing the hook from the latch when the bar is retracted, the movement of the hook causing the connections to move the trigger into engagement with the arm for holding it against swinging.

4. The combination with a truck having a pintle and a vehicle having a tongue, of a sleeve pivotally secured to the tongue and being swingable about an axis that extends at right angles to the plane of the tongue, a draw-bar slidably carried by the sleeve and having a pintle receiving eye at its forward end, a collar placed on the bar near the eye, said bar having a longitudinally extending slot at the rear end, an arm pivoted to the tongue, a trunnion carried by the free end of the arm and being slidably received in the slot, a latch connected to the tongue and engaging with the collar when the bar is fully retracted, a hook for holding the latch in released position, the arm paralleling the bar when the latter is fully retracted, a trigger engageable with the arm for holding it from swinging when the bar is retracted, and connections between the hook and trigger for releasing the trigger from the arm when the hook engages with the latch for holding it in released position.

5. The combination with a truck having a pintle and a vehicle having a tongue, of a sleeve pivotally secured to the tongue, a draw-bar slidably carried by the sleeve, the front end of the bar having a pintle-receiving eye, an arm having one end pivotally secured to the tongue and its other end pivotally secured to the rear end of the draw-bar, the arm permitting the bar to assume various angular positions when the bar is extended to connect the eye to the pintle, and automatic means engaging with the bar when the latter is retracted for holding the bar from longitudinal movement and lateral swinging movement with respect to the tongue.

6. The combination with a vehicle tongue, of a draw-bar, means for securing the bar to the tongue with freedom of swinging and sliding action, whereby the bar may have its forward end advanced in front of the tongue and swung into a desired position so as to be connected to a pulling vehicle, means for guiding the rear end of the bar into a predetermined position as the bar is retracted, and automatic locking means becoming active when the bar is fully retracted for preventing forward movement of the bar and for preventing swinging movement of the rear end of the bar with respect to the tongue.

7. The combination with a vehicle tongue, of a sleeve pivotally secured to the tongue and being swingable about an axis that extends at right angles to the plane of the tongue, a draw bar slidably carried by the sleeve and having a pintle-receiving eye at its front end, a collar placed on the bar near the eye, said bar having a longitudinally extending slot at the rear end, an arm pivoted to the tongue, a trunnion carried by the free end of the arm and being slidably received in the slot, a latch pivotally connected to the tongue and engaging with the collar when the bar is fully retracted, a hook for holding the latch in released position, said arm paralleling the bar when the latter is fully retracted, a trigger engageable with the arm for holding it from swinging when the bar is retracted, and connections between the hook and trigger for releasing the trigger from the arm when the hook engages with the latch for holding it in released position and a spring-pressed bolt for holding the latch against accidental disengagement from the collar when the latch once engages therewith.

ANDREW B. CLARK.
KENNETH C. CLARK.

REFERENCES CITED

The following references are of record in the file of this patent:

UNITED STATES PATENTS

| Number | Name | Date |
| --- | --- | --- |
| 1,851,349 | Coules | Mar. 29, 1932 |
| 1,895,992 | Hepburn | Jan. 31, 1933 |
| 2,386,195 | Clark | Oct. 9, 1945 |